(12) United States Patent
Withers et al.

(10) Patent No.: US 9,500,184 B2
(45) Date of Patent: Nov. 22, 2016

(54) APPARATUS AND METHOD FOR SOLAR AND WIND BASED POWER GENERATION

(71) Applicant: Zephyr Energy Systems LLC, Shakopee, MN (US)

(72) Inventors: Randall Withers, St. Louis Park, MN (US); Benjamin Stout, Shakopee, MN (US)

(73) Assignee: Zephyr Energy Systems LLC, Shakopee, MN (US)

( * ) Notice: Subject to any disclaimer, the term of this patent is extended or adjusted under 35 U.S.C. 154(b) by 0 days.

(21) Appl. No.: 14/450,364

(22) Filed: Aug. 4, 2014

(65) Prior Publication Data

US 2016/0032901 A1   Feb. 4, 2016

(51) Int. Cl.
*F03G 6/04* (2006.01)
*F03G 6/00* (2006.01)
*F03D 9/00* (2016.01)
(Continued)

(52) U.S. Cl.
CPC ............ *F03G 6/045* (2013.01); *F03D 1/04* (2013.01); *F03D 9/007* (2013.01); *F03G 6/00* (2013.01); *F03G 6/04* (2013.01); *F24J 2/50* (2013.01); *H02K 7/1823* (2013.01); *F05B 2240/131* (2013.01); *F05B 2260/24* (2013.01);
(Continued)

(58) Field of Classification Search
CPC ............ F03G 6/045; F03G 6/00; F03G 6/04; Y02E 10/465; F03D 9/007; F03D 1/04; F05B 2240/131; F05B 2260/24; F24J 2/50; Y10S 415/909
USPC ............................................ 60/641.8–641.15
See application file for complete search history.

(56) References Cited

U.S. PATENT DOCUMENTS 3,979,597 A * 9/1976 Drucker .......................... 290/55
4,096,698 A   6/1978 Martin
(Continued)

FOREIGN PATENT DOCUMENTS

CN    201281403    7/2009
DE    102005037997    2/2007
(Continued)

OTHER PUBLICATIONS

"Gallery: The Solar Stik Portable Power Generator", Inhabitat.com, accessed on the Internet Aug. 8, 2014. URL: <http://www.inhabitat.com/solar-stick-portable-power-generator/attachment/14403/> (6 pages).
(Continued)

*Primary Examiner* — Nicholas J Weiss
*Assistant Examiner* — Wesley Harris
(74) *Attorney, Agent, or Firm* — Winthrop & Weinstine, P.A.

(57) ABSTRACT

An apparatus for converting solar energy may have a heat-capturing element that generates thermal energy when exposed to solar radiation and a canopy arranged about the heat-capturing element. The canopy may define a chamber with an intake and an output, and may be configured for substantially trapping air particles in proximity to the heat-capturing element throughout a pathway from the intake to the output. A portion of the chamber arranged near the output may have a decreased cross section. The apparatus may also include a thermal transfer system configured for creating a positive thermal feedback between a portion of the heat-capturing element near the output and a portion of the heat-capturing element near the intake, and at least one horizontal turbine arranged at the output.

19 Claims, 5 Drawing Sheets

(51) Int. Cl.
  *F03D 1/04* (2006.01)
  *F24J 2/50* (2006.01)
  *H02K 7/18* (2006.01)

(52) U.S. Cl.
  CPC .............. *Y02E10/465* (2013.01); *Y02E 10/72* (2013.01); *Y10S 415/909* (2013.01)

(56) References Cited

U.S. PATENT DOCUMENTS

| | | | |
|---|---|---|---|
| 4,420,939 A | 12/1983 | McCue | |
| 4,433,544 A | 2/1984 | Wells et al. | |
| 4,453,383 A | 6/1984 | Collins | |
| 4,481,774 A | 11/1984 | Snook | |
| 7,552,589 B2 * | 6/2009 | Mok | 60/641.15 |
| 7,821,151 B2 | 10/2010 | Le et al. | |
| 8,115,332 B2 | 2/2012 | Glynn | |
| 8,534,068 B2 | 9/2013 | Yangpichit | |
| 8,552,581 B2 | 10/2013 | Miller | |
| 2005/0086937 A1 * | 4/2005 | Royer | 60/641.8 |
| 2006/0037319 A1 | 2/2006 | Kaufman | |

FOREIGN PATENT DOCUMENTS

| | | |
|---|---|---|
| DE | 102009040219 | 3/2011 |
| EP | 0003185 | 7/1979 |
| EP | 0017105 | 10/1980 |
| GB | 2062107 | 5/1981 |
| GB | 2458272 | 9/2009 |
| WO | 2007113200 | 10/2007 |
| WO | 2009005842 | 1/2009 |
| WO | 2009018632 | 2/2009 |

OTHER PUBLICATIONS

International Search Report and Written Opinion for related PCT Application No. PCT/US2015/043425 mailed Oct. 7, 2015 (10 pages).

* cited by examiner

APPARATUS AND METHOD FOR SOLAR AND WIND BASED POWER GENERATION

FIELD OF THE INVENTION

The present disclosure relates to apparatuses and methods for converting natural resources into a power source. Particularly, the present disclosures relates to harnessing solar and wind energy. More particularly, the present disclosure relates to using solar energy to create air currents that may, in turn, power wind turbines.

BACKGROUND OF THE INVENTION

As the environmental and economic costs of conventional power sources rise, there is an increasing interest in developing environmentally friendly and cost-effective energy sources. Devices such as solar cells and solar panels have been used to convert natural sunlight into electric energy. As another example, wind turbines may be used to harness natural air currents and convert kinetic energy to electric energy. However, there are drawbacks to these systems. For example, solar cells may be inefficient when sunlight is indirect, for example on cloudy days. Further, the efficiency of wind turbines generally may depend on location, as the turbines are most effective in an area that receives high or frequent winds.

Wind occurs naturally due, in large part, to the sun's energy. When the sun warms the earth's surface, air directly above the earth's surface warms as well. The warmed air expands with a lower density than surrounding air, and the warmed air therefore rises. As warmed air rises, pressure differences cause the surrounding air to fill the space left by the rising warm air. This process of rising air results in wind currents.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In one or more embodiments an apparatus for converting solar energy may include a heat-capturing element that generates thermal energy when exposed to solar radiation. The apparatus may also include a canopy arranged about the heat-capturing element and defining a chamber with an intake and an output. The canopy may be configured for substantially trapping air particles in proximity to the heat-capturing element throughout a pathway from the intake to the output. A portion of the chamber arranged near the output may include a decreased cross section. The apparatus may also include a thermal transfer system configured for creating a positive thermal feedback between a portion of the heat-capturing element near the output and a portion of the heat-capturing element near the intake. The apparatus may also include a horizontal turbine arranged at the output. Thermal energy generated by the heat-capturing element may cause surrounding air particles within the chamber to thermally expand and rise. The rising air may be directed through the portion of the canopy with a decreased cross section and through the output. The rising air may pass across the turbine as it exits the chamber.

In one or more other embodiments, an apparatus for generating electric power may include a heat-capturing element that generates thermal energy when exposed to solar radiation. The apparatus may include a canopy defining a volume surrounding the heat-capturing element and substantially trapping air particles in proximity to the heat-capturing element. A portion of the volume may have a decreased cross section. The apparatus may also include a thermal system comprising a heat-absorbing fluid and at least one conduit for transporting the heat-absorbing fluid. The apparatus may also include at least one horizontal turbine and an electric generator coupled to the at least one horizontal turbine. The thermal energy generated by the heat-capturing element may cause surrounding air particles within the canopy to thermally expand and rise. The rising air may be directed through the portion of the canopy with a decreased cross section. The rising air passes across the at least one horizontal turbine as it exits the canopy.

In one or more other embodiments, a method for utilizing solar energy may include exposing a heat-capturing element to solar radiation such that the heat-capturing element generates thermal energy. The method may also include substantially trapping air particles in proximity to the heat-capturing element, such that a portion of the air particles thermally expand and rise when the heat-capturing element generates thermal energy. The method may also include directing the rising air particles through a decreasing volume such that the particles become restricted and their velocity increases. The method may also include performing a positive thermal feedback operation on the heat-capturing element. The method may also include directing the rising air particles across at least one horizontal turbine, causing the turbine to turn with kinetic energy, and converting the kinetic energy from the at least one turbine through the use of an electric generator.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure, in some embodiments, relates to an apparatus and method for converting natural energy into useable power. Particularly, the present disclosure, in some embodiments, relates to an enclosure with a dark surface and a transparent, translucent, or other type of canopy for allowing light to pass through and reach the dark surface while capturing the heat generated by the light on the dark surface. The enclosure may be shaped to cause the heated air within the enclosure to flow generally upwardly creating an artificial wind current, while the air continues to be heated by the dark surface within the enclosure. In addition to continually heating the air, the system may be designed to perform positive thermal feedback to create a more efficient heating process. The enclosure may be equipped with one or more turbines that may be coupled to an electric generator such that the system may generate electricity. Additionally, in some embodiments, a thermal energy storage unit may be used to collect and store thermal energy from the dark heat-capturing element. The heat storage system may include pipes or conduits containing a heat-absorbing material and a storage tank or tanks for storing thermal energy for later use.

The solar and wind based power generator, in some embodiments, may be used in large scale operations for utility purposes. For example, the generator may be constructed as a large facility, building, and/or structure and may be particularly suited for power generation for a utility or other entity. In some embodiments, the generator may be smaller in size and adapted for powering a particular facility and, as such, may be incorporated into a particular aspect of a facility, such as the roof of a facility or building. Still other sizes of the generator may be created and are within the scope of the invention.

Figure 1:
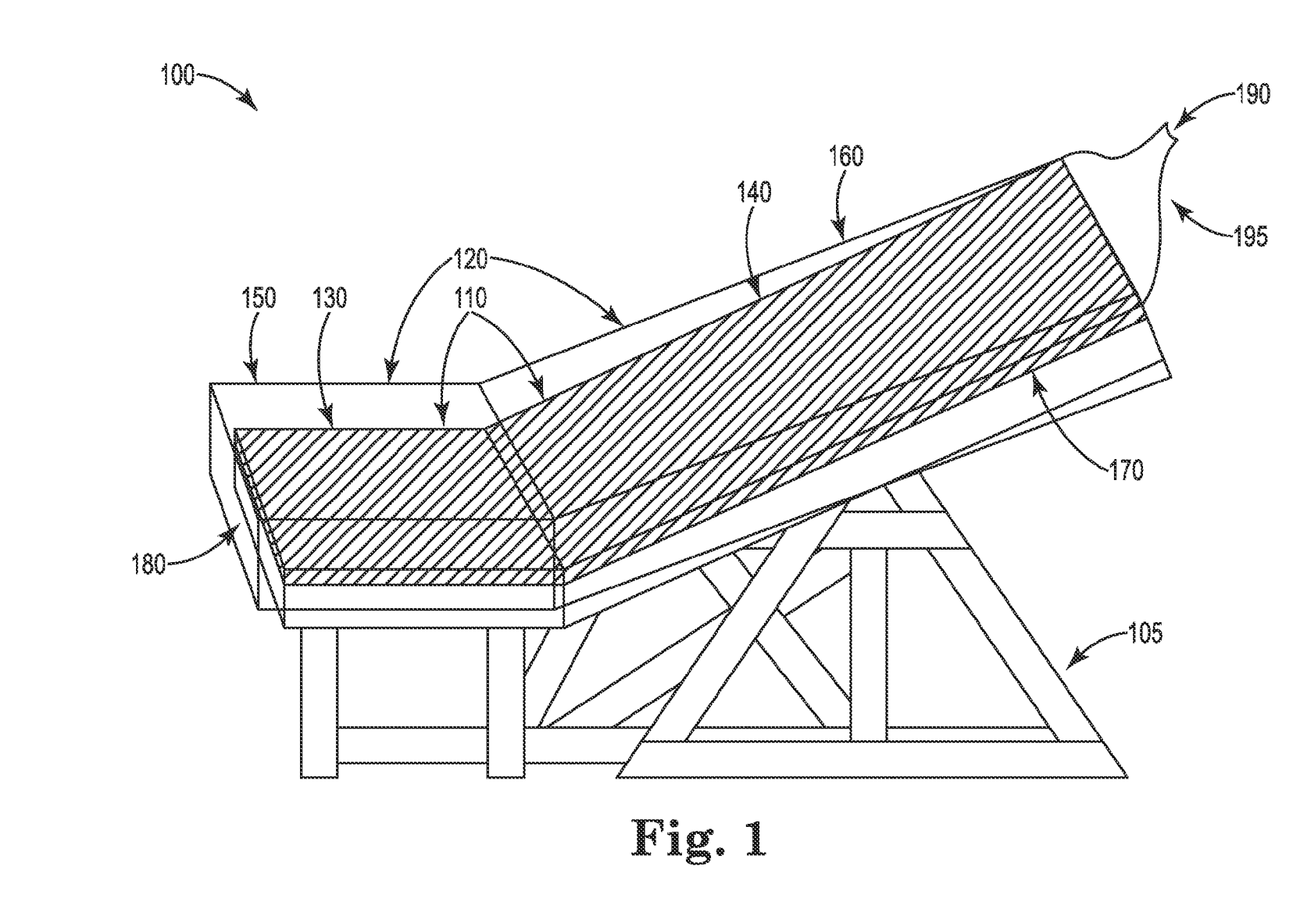
FIG. 1 is a perspective view of an apparatus for solar and wind based power generation according to some embodiments.

FIG. 1 depicts one embodiment of a solar and wind based power generator 100 of the present disclosure. As shown in FIG. 1, the generator may include a supporting portion 105, a heat-capturing element 110, and a canopy 120 secured over or about the heat-capturing element 110.

The supporting portion 105 may provide support for a horizontal and/or inclined portion of heat-capturing element 110. In some embodiments, the supporting portion 105 may be a structural framework. It may be constructed of wood, metal, plastic, masonry, concrete, any other suitable material, or a combination of materials. The structural framework may include a foundation, a framing system of columns, beams, and braces, walls, and/or a combination of these types systems. Other systems and approaches including prefabricated walls, decks, trusses, or other components may also be used. In some embodiments, the system may be constructed on the ground where, for example, the ground is bermed or otherwise shaped to provide a suitable angle for the heat-capturing element 110. In this embodiment, the supporting portion 105 may consist entirely or partially of the ground, itself. In either case, the supporting portion 105 may include a system of lifts, actuators, cylinders, or other similar mechanisms that allow at least a portion of the generator to be moved or positioned. For example, such mechanisms may allow for the angle of an inclined portion 140 of the heat-capturing element 110 to be adjusted based on the time of year or other changes in the angle of incoming sunlight. As another example, such mechanisms may allow for the heat-capturing element 110 to be rotated or repositioned so that it faces a different direction based on the time of day or year or other changes in incoming sunlight.

The heat-capturing element 110 may be constructed on the supporting portion 105. In some embodiments, the heat-capturing element 110 may be composed of concrete or any other material that can absorb and radiate heat. Other material examples may include iron, steel, brick, grouted masonry, and the like. Where the element 110 is composed of concrete, additives such as, for example, fly ash or powdered mining tailings may be combined with the concrete mix in order to increase strength, density, durability, or absorbing capacity. Rebar, metal mesh, or any other suitable reinforcing device may be placed within the concrete. In some embodiments, the heat-capturing element may be painted, stained, or otherwise covered with a non-reflective material. For example, a flexible, flat black, or other dark-colored, paint may be painted over the heat-capturing element 110 in some embodiments so as to increase heat absorption and minimize reflection.

The heat-capturing element 110 may be formed into any shape. A shape that provides for a large surface area that can directly face sunlight may be most efficient. For example, as shown in FIG. 1, a heat-capturing element 110 may be a relatively thin rectangular or square shape with a substantially flat surface. In other embodiments, the surface may be cupped or dished to maximize the amount of time that a portion of the surface is exposed to direct sunlight or sunlight with a low angle of incidence. The heat-capturing element 110 may be formed from one or more sections and may have joints running between individual sections. The heat-capturing element 110 may be positioned substantially horizontally, or it may be angled such that it is on an inclined plane. In some embodiments, as show in FIG. 1, a first portion 130 of the heat-capturing element may be positioned horizontally, while a second adjoining portion 140, which lies adjacent or substantially adjacent to the first portion 130, may be positioned on an inclined plane. The inclined portion 140 may be longer than the horizontal portion 130 in some embodiments. The angle of an inclined portion 140 of the heat-capturing element 110 may be determined based on the apparatus's latitudinal location on the earth's surface so as to facilitate long, direct, and otherwise efficient exposure to solar radiation. For example, a steeper angle may be required at higher latitudinal location than at a lower latitudinal location. In some embodiments, the system may be implemented between 70 degrees latitude north and south of the equator. In other embodiments, locations outside these latitudinal boundaries may be used. The angle of the inclined portion may depend on the geographic location of the apparatus as well as the maximum azimuth of the sun. This may allow for maximization of the amount of time during which, at a particular geographic location, the heat-capturing element is substantially perpendicular with natural sunlight. Similarly, the heat-capturing element 110 may be directed to face a particular direction. For example, in the northern hemisphere, it may be advantageous for the surface 110 to face substantially south, and in the southern hemisphere to face substantially north. Once again, this may allow for maximization of direct sunlight exposure. In some embodiments, the inclined portion 140 of the heat-capturing element 110 may be substantially fixed at a particular angle from the horizontal. In other embodiments, the angle of the inclined portion 140 may be changeable or adjustable. Generally, the inclined portion may be inclined at an angle ranging from approximately 20 degrees to approximately 70 degrees, or from approximately 30 degrees to approximately 60 degrees, or approximately 45 degrees. Still other values for the angle of the inclined portion may be used that are within the ranges or outside the ranges mentioned. It is to be appreciated that consideration may be given both to the angle of the sun, but also to amount of uprightness of the unit since the rising of air provides the desired effect of creating air flow and producing power. As such, at locations near the equator, where, for example, the sunlight may be relatively flat, a relatively flat inclination of the unit may result in an inefficient system because of the loss of the rising air effect.

The heat-capturing element may also include an insulating material 170. The insulating material 170 may be configured to resist losses of heat from the heat-capturing element except when heating the air in the generator. Accordingly, the insulating material may be placed beneath and/or around the sides of the heat-capturing element 110. The insulating material 170 may be selected depending on the size, shape, and type of construction used to construct the generator. In some embodiments, the insulating material may be a flowable curable material such as a highly insulative foam or a concrete including insulation. In other embodiments, the insulating material 170 may be a rigid insulation or the insulating material may include a frame structure having batt-type insulation installed therein. In some embodiments, the insulating material 170 may have an insulation rating of approximately R-10 to approximately R-60, or from approximately R-15 to approximately R-30, or an insulation rating of approximately R-20 may be used. Still other R-ratings can be used within or outside the ranges mentioned.

Figure 2:
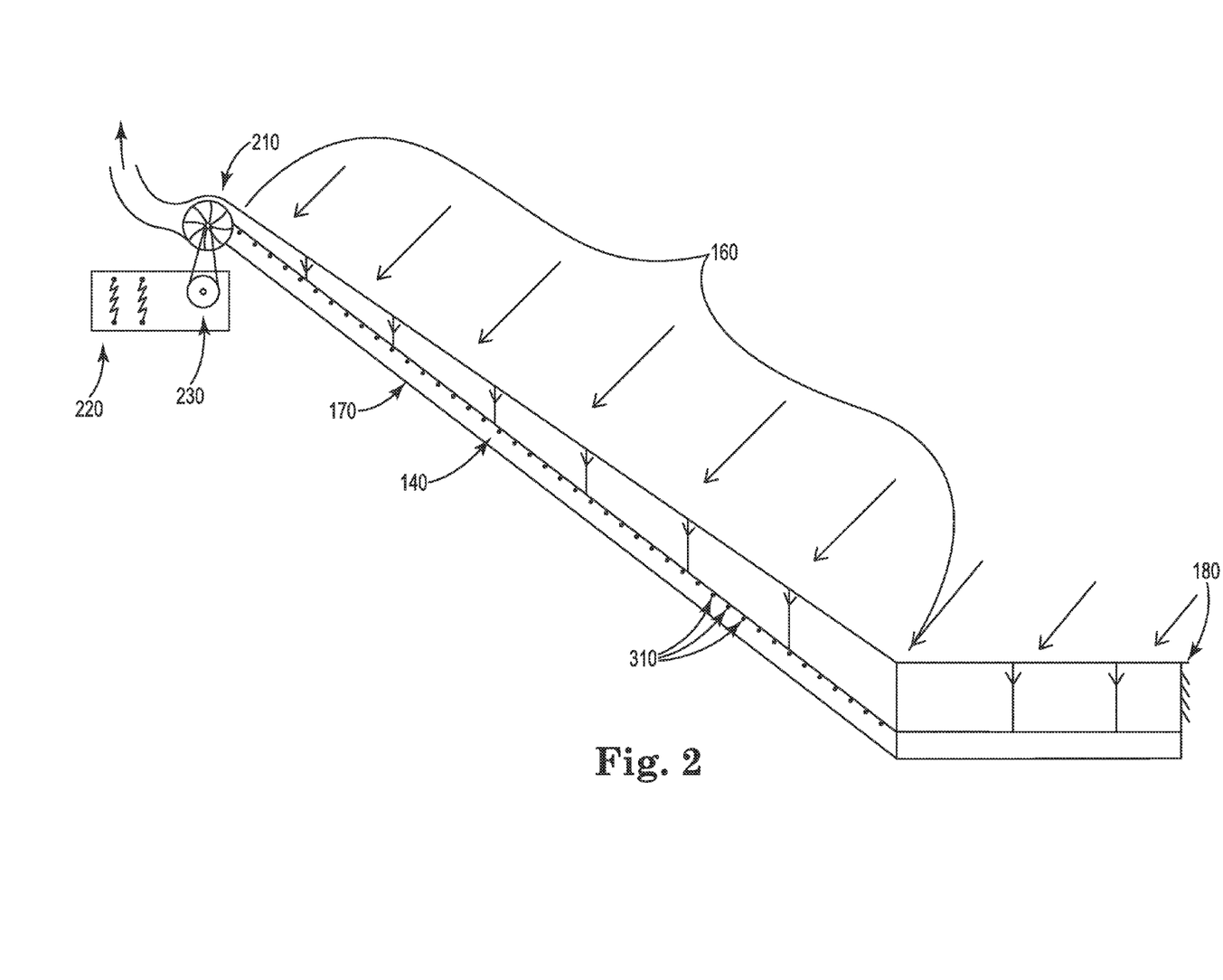
FIG. 2 is a conceptual diagram of an apparatus for solar and wind based power according to some embodiments.

As shown in FIG. 1, the solar and wind based power generator 100 of the present disclosure may include a canopy 120 in some embodiments. The canopy 120 may be composed of clear glass or plastic or any other translucent, transparent, or substantially transparent material. In some embodiments, the canopy may include a one-way mirror type material such that sunlight may freely enter the generator, but be continually reflected against the heat-capturing element if reflected off of the heat-capturing element. The canopy 120 may be supported by a framework, such as but not limited to a metal framework that acts to hold the canopy 120 above the heat-capturing element 110 in some embodiments. The canopy 120 may define a volume or chamber around the top and/or sides of the heat-capturing element 110. According to some embodiments, as shown in FIG. 1, where the heat-capturing element 110 consists of a horizontal portion 130 and an inclined portion 140, the canopy 120 may similarly include a horizontal portion 150 and an inclined portion 160. In some embodiments, portions of the canopy 120 may be positioned closer to the heat-capturing element 110 than other portions. For example, as shown in FIG. 2, an inclined portion of the canopy 160 may be inclined at a shallower angle than the surface 140, such that the canopy 160 becomes gradually closer to the heat-capturing element 140 such that the cross-sectional area of the volume or chamber becomes gradually smaller. According to some embodiments, the height reduction between the canopy 160 and heat-capturing element 140 that results from the different inclining rates may be about 10:1 as the canopy extends from one end of the heat-capturing element to the other end. In some embodiments, this reduction may occur over a length of approximately 10 to approximately 20 times the intake height or a length of approximately 12 to approximately 18 times the intake height or a length of approximately 15 times the intake height. So, for example, a 20 foot high intake may reduce to approximately 2 feet at the output (i.e., 10:1) and this reduction may occur over a length of approximately 300 feet (i.e., 15:1). The width of the unit may vary depending on the turbine layout, manifold geometry, and the like. In some embodiments, the width may be approximately 1 to 6 times the intake height, or approximately 1.5 to 4 times the intake height or approximately 2 times the intake height. Still other widths may be selected.

In some embodiments, the canopy may be generally flat and inclined as shown. However, in other embodiments, the canopy may be curved so as to magnify or focus light onto the heat absorbing surface. In still other embodiments, a secondary or magnifying canopy may be provided above the chamber defining canopy. This secondary canopy may function to focus light from a larger area onto the heat absorbing surface where the chamber defining canopy functions to allow the focused light through and control airflow. Still other arrangements of a primary and secondary canopy may be provided.

The canopy 120 may have one or more openings, such as for example an intake opening 180 and an output opening 190. Outside air may enter the system through the intake 180 and exit the system through the output 190. Louvers may be placed over the intake 180 and/or output 190 so as to mitigate rain, dust, or other elements from entering the system. The output 190 may be about one tenth the size of the intake 180. Further, in some embodiments, a portion of the canopy 120 may funnel or narrow toward the output 190 via a manifold, flow control structure, or other funneling portion 195, as shown in FIG. 1, thus directing air toward the output 190. The funneling portion 195 of the canopy 120 may be constructed of the same translucent, transparent, or substantially transparent material as other portions of the canopy 120, or it may be constructed of some other material such as a plastic or metal. As shown in FIG. 1, the funneling portion 195 of the canopy 120 may be located above the heat-capturing element 110, such that the heat-capturing element does not form a wall of the funneling portion 195. In other embodiments, the heat-capturing element 110 may form a side or wall of the funneling portion 195.

In some embodiments, the power generator of the present disclosure may include one or more turbines 210, as shown in FIG. 2. The one or more turbines 210 may be affixed to or near a high point of the heat-capturing element 110, such as the upper end of the inclined portion 140. The one or more turbines 210 may be positioned at or near the output 190 such that air escaping the canopy 120 may pass through the blades of the one or more turbines 210. The canopy 120 may generally route air that enters the canopy 120 toward the one or more turbines 210. That is, the canopy 120 and the heat-capturing element 110 may form a chamber through which rising air may be directed. In some embodiments, the canopy 120 may funnel or narrow toward the output 190, as shown in FIG. 1, such that in some cases only one turbine 210 may receive the escaping air. In some embodiments, the one or more turbines 210 may be substantially cylindrical in shape. The turbines 210 may have blades that rotate on a horizontal axis arranged generally perpendicular to the direction of flow (i.e., horizontal turbine) and may have a minimal radius and shallow depth as compared to more traditional wind turbines. In some embodiments, as shown in FIG. 2, the one or more turbines 210 may be coupled to a power unit such as, for example, an electrical generator 220. The connection may include, for example as shown in FIG. 2, a planetary gear transmission 230. In other embodiments, a fan-blade type turbine may be used.

Figure 3:
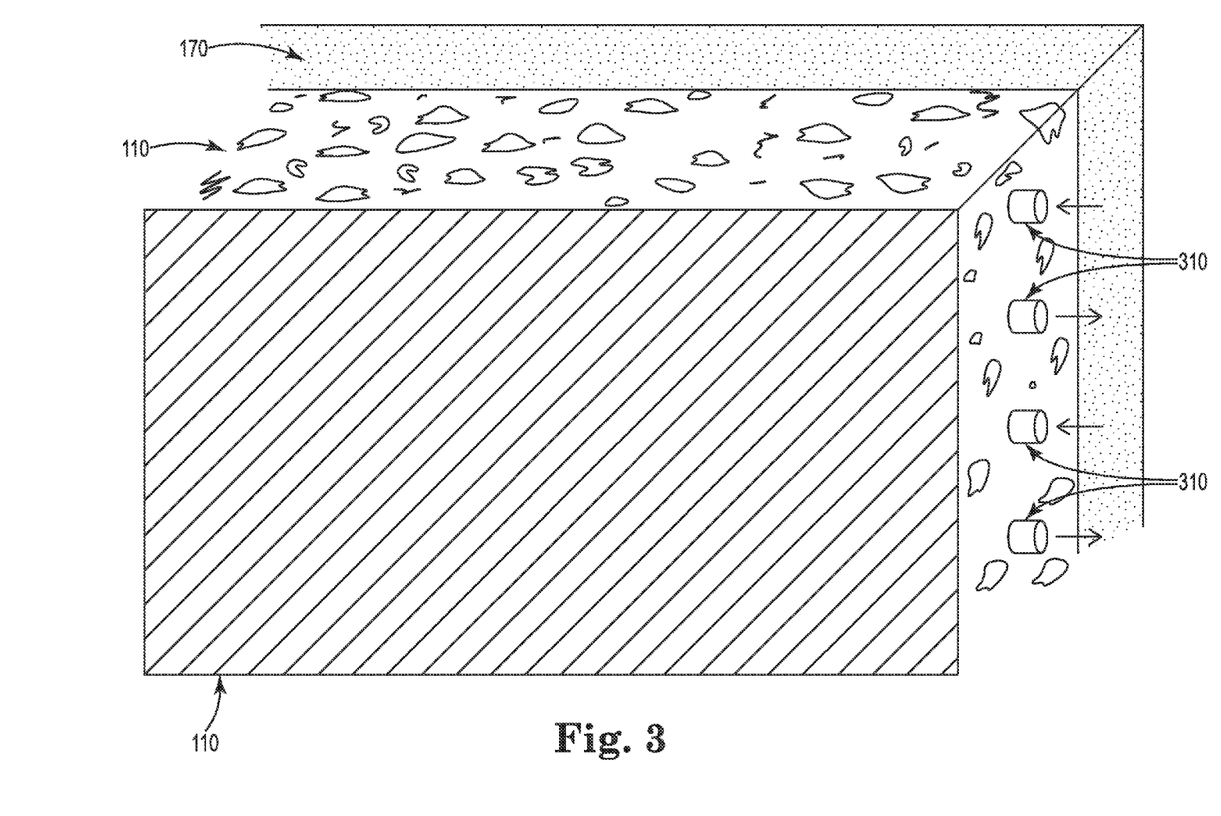
FIG. 3 is a cross sectional view of a heat-capturing element according to some embodiments.

Some embodiments of the solar and wind generator may include a thermal transfer system. The thermal transfer system may include one or more pipes or conduits of any suitable material and a heat-absorbing fluid that may flow through the piping. The piping may be embedded within or run adjacent to the heat-capturing element 110. As shown in FIG. 3, the piping 310 may be embedded within the material of the heat-capturing element 110, such as, for example, within the concrete in embodiments where the heat-capturing element 110 is composed of concrete. One or more flow lines may be positioned to transport the heat-absorbing fluid to or from different zones or areas of the heat-capturing element 110, thereby optimizing heat absorption of the heat absorbing surface 110. For example, the piping may transport the heat-absorbing fluid from a warmer portion of the heat-capturing element 110 to a cooler portion of the heat-capturing element 110, thus using excess thermal energy from one portion of the apparatus to assist in heating a different portion of the apparatus. Pumps 440 and/or valves 441 may be used to direct the flow in each pipeline. In some embodiments, the pumps 440 and/or valves 441 may be operated with a controller. Sensors may be used to monitor the relative temperature at various areas on the heat-capturing element 110 such that the heat-absorbing fluid may be directed where needed.

In some particular embodiments, the thermal transfer system may be used to increase the output of the system by creating a positive thermal feedback. For example, with the thermal transfer system turned off and a given sunlight and/or weather condition, the system may achieve a steady-state condition where the incoming air temperature is at a particular value and the exiting air temperature is at a higher particular value. For purposes of example, we can assume that the incoming air temperature is at 65 degrees F. and that as it passes through the system and is heated, the exiting air temperature is at 85 degrees F. In this steady-state condition, the heat-capturing element 110 may establish a temperature gradient. That is, due to the cooler incoming air at the intake, the surface temperature of the heat-capturing element 110 may be lower than the surface temperature of the heat-capturing element 110 closer to the output. For purposes of example, let's assume the surface temperature of the heat-capturing element near the intake is 150 degrees F. and that the surface temperature of the heat-capturing element near the output is 160 degrees F. In this steady-state condition, the power being generated by the system may be relatively consistent and may be dependent on the 20 degree increase in the temperature of the flowing air. This temperature increase may establish how much the air accelerates and may define an output velocity generating a particular amount of power.

Turning back to the use of a thermal transfer system, such a system may be used to ratchet up the output in the above system. That is, in the above example, if a thermal transfer system is used, the 160 degree portion of the heat-capturing element near the output may be used to circulate heat-absorbing fluid down to the portion of the heat-capturing element near the intake. This may allow for an increase in the temperature of the portion of the heat-capturing element near the intake to increase its temperature to approximately 154 degrees thus increasing the temperature near the output to approximately 165 degrees. However, this increased temperature near the intake may increase the rate at which the incoming air increases in temperature because such incoming air is amidst a hotter heat-absorbing element for a longer period of time. As such, in this system, the temperature increase in the flowing air may increase to 22 degrees, or 23 degrees, or even 25 or 30 degrees, for example. That is, the incoming air at 65 degrees may be increased to 87, 88, or even 90 or 95 degrees, for example. This incremental increase in the temperature increase of the air may create that much more energy generated by the system.

It is to be appreciated that one or more of the present systems may be grouped adjacent to one another to form a plant or other facility. For example, a series of several 40 foot wide units may be placed adjacent to one another. In some embodiments, where one unit or a series of units is running more efficiently than other neighboring units, the thermal transfer system may allow for redirecting heat from one unit to an adjacent unit.

Additionally or alternatively, some embodiments may include a thermal storage system. A thermal storage system may include one or more pipelines through which a heat-absorbing fluid may flow and a thermal storage chamber. As with the thermal transfer system, the one or more pipelines may be embedded in or run adjacent to the heat-capturing element 110. In some embodiments, the pipelines of the thermal transfer system and the pipelines of the thermal storage system may be the same pipelines. One or more pipelines may connect to a thermal storage chamber located beneath or near the heat-capturing element 110, allowing excess thermal energy to be collected and stored. For example, during high-sunlight portions of the day, the system may be overly stimulated causing some of the energy to be captured by the turbines and causing other energy to be shed by heat loss. In other cases, the turbine speed may be excessive requiring that a brake be applied or other measures taken to avoid damaging the system. In these situations, a thermal storage system may be utilized to capture some of the excess energy. In other cases, even when the energy is not necessarily excessive, an operator may anticipate upcoming conditions of cloudiness, smog, or other low energy conditions such that charging the thermal storage system may be advantageous. In these situations, the pipelines may be used to absorb some of the excess heat and save the heat energy for later use.

It is to be appreciated that upon initial startup of the system, a period of charging may be required. That is, as the system begins to capture energy from sunlight and heat the heat-capturing element, some of the energy may immediately be used to run the turbines and some of the energy may be used to heat the thermal storage system. Initially, this will take some time to bring the thermal storage system up to temperature. However, once the thermal storage system is up to temperature, it may no longer take as much energy to maintain the temperature and when the thermal storage system is used to redirect energy to the system, such might be monitored so as to not draw so much energy out that a full recharge is required. Operator decisions and judgments may be used to monitor the relative temperatures and energies and adjust settings of the system to control the amount of energy that is stored at particular periods.

The storage chamber may be located at least partially underground. It may be embedded in sand, soil or some other suitable material. An insulating material may surround the storage chamber. As with the thermal transfer system, pumps 440 and/or valves 441 may be used to direct the flow in each pipeline, and a controller may be used to operate the pumps 440 and/or valves 441. Sensors may also be used to monitor the temperature of various areas of the heat-capturing element 110 such that the heat-absorbing fluid may be directed to the surface to collect excess heat or distribute stored heat when needed.

Figure 4:
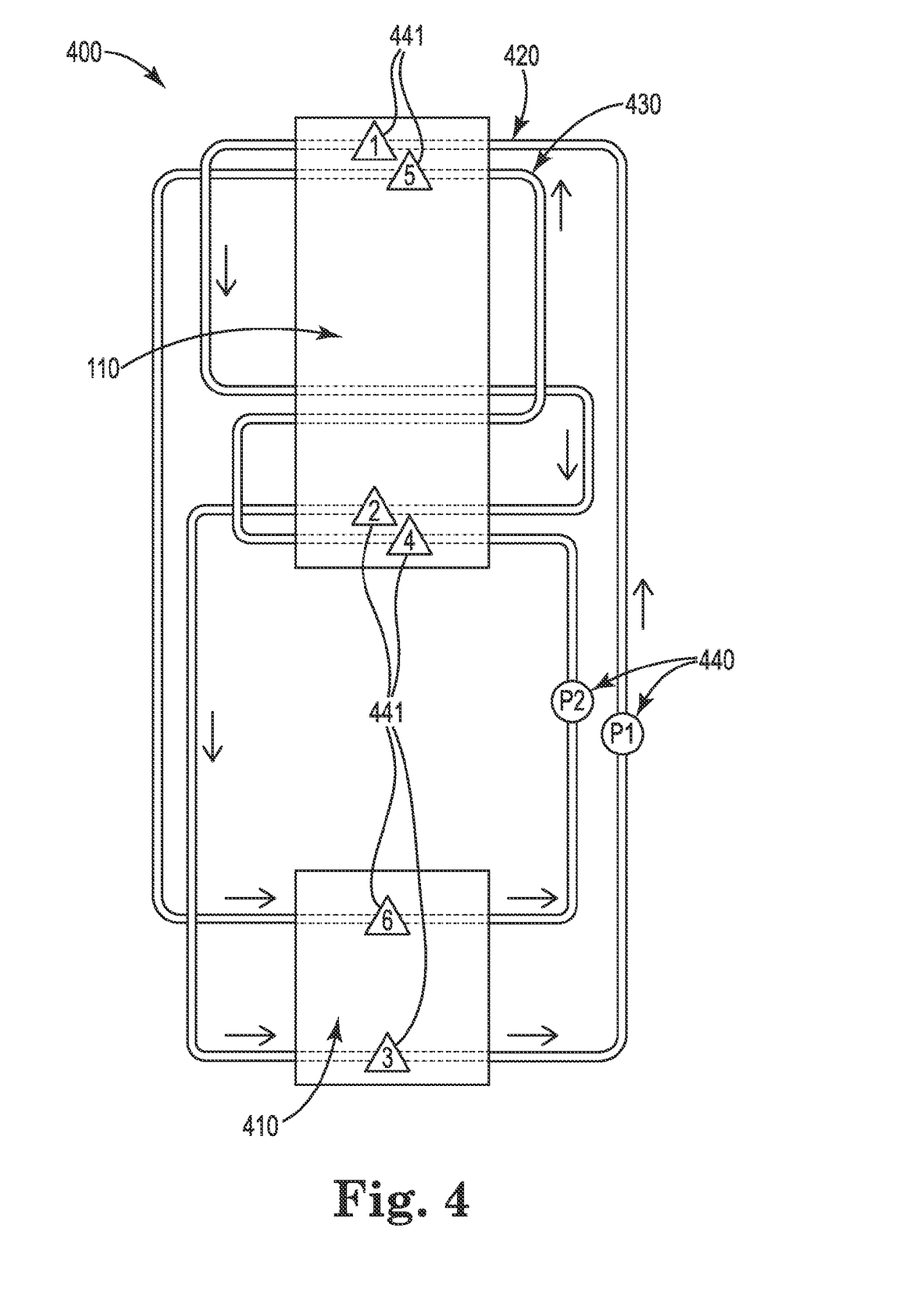
FIG. 4 is a schematic diagram of one embodiment of thermal storage unit piping according to some embodiments.

FIG. 4 shows one embodiment of a thermal piping layout 400 in conjunction with both a thermal transfer system and thermal storage system. As shown in FIG. 4, two separate flow lines 420, 430 may run between the heat-capturing element 110 and the storage chamber 410. A first pipeline 420 may be designated an input line that collects thermal energy from the heat-capturing element 110 via a heat-absorbing fluid, and then transfers the heat-absorbing fluid to the storage chamber 410. A second pipeline 430 may be designated an output line and may transfer thermal energy from the storage unit 410 via heat-absorbing fluid to the heat-capturing element 110. In other embodiments, there may be a plurality of pipelines, some of which may be input lines and some of which may be output lines. In other embodiments, the same line or lines may function for both input and output purposes. In conjunction with a thermal transfer system, the same pipelines 420, 430 may also run through different zones or areas of the heat-capturing element 110, allowing the heat-absorbing fluid to transfer heat from one region to another. The heat-absorbing fluid may move through the pipelines through the use of pumps 440 and/or valves 441. In addition, heat exchangers, veins, fins, or other heat exchanging technologies may be implemented as the fluid is moved through the heat-capturing element and the storage chamber. That is, where energy transfer is more efficient when the surface area of the heat-absorbing fluid is increased, such mechanisms may be implemented to do so.

Figure 5:
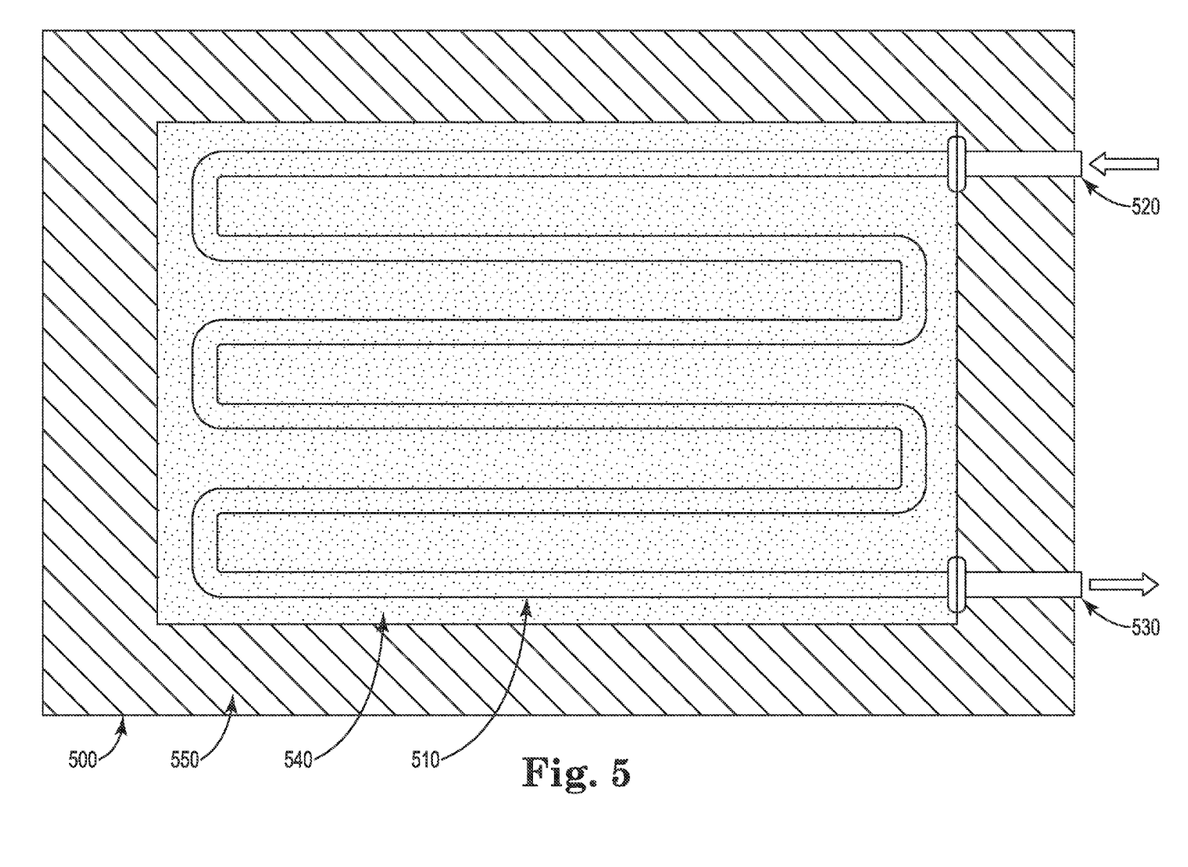
FIG. 5 is a cross sectional view of a thermal storage unit chamber according to some embodiments.

FIG. 5 illustrates one example of a storage chamber 500 for a thermal storage system of the present disclosure. The storage chamber 500 may include a chamber 510 for a heat storage medium 540 such as sand, steel shot, taconite tailings, or other material. The chamber 510 may have at least one input 520 and at least one output 530 connection. The chamber 510 may be surrounded by or embedded in an insulating material. The storage chamber 500 may be encased by a shell 550 composed of concrete, metal, plastic, or any other suitable material and the shell may be lined with a water proof liner or other tank or system for containing the heat storage medium. The storage chamber 510 may receive heat-absorbing fluid from the thermal piping when the system is being used to capture excess heat/energy. When the system is running less efficiently, the heat-absorbing fluid may be routed back to the heat-capturing element to supplement heat/energy from sunlight.

In use, the solar and wind power generator of the present disclosure may be faced and angled, as discussed above, such that the heat-capturing element 110 receives a maximum amount of sunlight exposure for a geographic location. As the heat-capturing element 110 is exposed to sunlight, it may increase in temperature, thus converting the solar radiation into thermal energy. As the temperature of the heat-capturing element 110 increases, the temperature of the air in close proximity to the heat-capturing element 110 and within the canopy 120 may increase as well. As the air's temperature increases, its density may decrease, and the air may have a tendency to rise. As the heated air rises within the canopy 120, it may be substantially contained within the canopy 120 or between the canopy 120 and the heat-capturing element 110. An inclined portion 140, 160 of the heat absorbing surface 110 and canopy 120 may direct the rising air toward a desired point. This movement of warmed air within the canopy 120 creates a synthetic wind, thus converting the heat-capturing element's thermal energy into kinetic energy. As the heated air rises through the canopy 120, it may continue to move across or come in close proximity to the heat-capturing element 110. This continued contact with the heat-capturing element 110 during rising may allow the heated air to maintain its temperature or further increase in temperature. According to some embodiments, the air temperature may increase by as much as 20 degrees over a twelve-foot span of the heat-capturing element. This may further increase the air's velocity as it rises. As the air rises, it may be directed through the canopy 120 toward an output 190. At or near the top of the canopy 120, the output 190 may allow rising, heated air to escape. Where one or more turbines 210 are located at or near the output 190, the rising air that flows out of the output 190 may cause the turbines 210 to turn. As the turbines 210 turn, they may also rotate a planetary gear transmission 230, powering an electric generator 220.

In some embodiments, a portion of the canopy 120 may have a reduced cross section, thus restricting the rising air's volume, and causing its rising velocity to increase. For example, in FIG. 2 where an inclined portion 160 grows gradually closer to the heat-capturing element 140, the rising air may become constricted. Particularly, as the warmed air rises through the inclined portion of the canopy 160, it may be forced through a gradually smaller space until it reaches an opening at the top of the canopy 120. Such gradual restriction may increase or accelerate the speed at which the warmed air rises, thus increasing its velocity as it exits the canopy 120, which may cause greater movement within the one or more turbines 210. Still further, the exposed surface area of the heat-capturing element 110 per unit volume of air being heated may increase thereby increasing the ability of the heat-capturing element 110 to impart heat energy on the air.

The use of a thermal storage system and/or thermal transfer system may further warm the air and increase the speed at which it exits the canopy 120. For example, where piping for a thermal transfer unit transfers a heat-absorbing fluid from a warmer zone on the heat-capturing element 110, such as the top of the inclined portion 140 in some embodiments, to a cooler zone, such as the horizontal portion 130 of the surface in some embodiments, the heat-absorbing material may allow the cooler zone to warm faster or to a higher temperature. This may heat the surrounding air faster or to a higher temperature, which may cause it to rise at a higher velocity. Additionally, as described above, in some embodiments, a thermal storage system may transport some thermal energy from the heat-capturing element 110 to a storage chamber 500. Storage of excess thermal energy may allow for continued use of the apparatus during time of low or no sunlight. For example, on a cloudy day, pumps 440 and/or valves 441 may be used to transport previously stored thermal energy in heat-absorbing material through the thermal piping 310 and back to the heat-capturing element 110, thus warming the heat-capturing element 110.

The generator of the present disclosure may generally function as an open system, such that for a quantity of air that enters the system over a time period, the same quantity of air may exit the system during the same period. As described above, the intake 180 may be ten times larger than the output 190 in some embodiments. Thus, to function as an open system, the air within the system may accelerate in order to exit at the same rate that it enters. For example, in a unit having a 10" intake and a 1" output over a distance of 12 feet and a width of 4 feet, air entered the system at the intake 180 at 100 kilograms per second with a velocity of 1 kilometer per hour. The same air accelerated to about fifty kilometers per hour to exit the system through the smaller output 190. It may be known in the art that kinetic energy in a given mass equals the mass, multiplied by velocity squared, and divided by half ($KE = \frac{1}{2}MV^2$). Thus, from the example above, the kinetic energy entering the system may be calculated as: $KE_{intake} = \frac{1}{2}(100 \times 1^2) = 50$ units. The kinetic energy exiting the system may then be calculated as: $KE_{output} = \frac{1}{2}(100 \times 50^2) = 125,000$ units. The resulting kinetic energy output is 2500 times increased from the kinetic energy intake. The increase in kinetic energy may be derived primarily from the artificial wind currents created within the system. As the air particles thermally expand and become restricted by a reduced cross section, the air particles may need to accelerate in order to exit the system and accommodate the inflow of cooler air entering at the input 180.

The apparatuses and methods described herein relate to a power generator that converts solar radiation into thermal energy, kinetic energy, and ultimately electrical energy. As a heat-capturing element 110 is exposed to the sun's radiation, it may become warmed, thus warming the air trapped beneath the canopy 120. As the air trapped beneath the canopy 120 warms, it may rise toward an output 190 in the canopy 120. As the air rises, it may become warmer and/or rise faster due to a constricted volume, continued proximity to the heat-capturing element 110, and/or thermal storage unit piping 310. As the air rises, cooler atmospheric air may enter the canopy 120 through a lower intake 180. Thus, a continuous cycle of synthetic wind may be created within the canopy 120. In this respect, the system may not require warm weather or warm outside air temperature. Instead, the system generates thermal energy from sunlight and kinetic energy is created through the resulting temperature differentials within the system. Thus, the system could, for example, be operated during winter months as well as summer months in some geographic locations. As rising air exits the canopy 120 through an output 190, wind turbine(s) 210 may turn. The turbines may be used to power, for example, an electric generator 220. The solar and wind generator of the present disclosure may be constructed for small or large scale applications. In some embodiments, modular elements may be used and shipped to a site location and local concrete may be used to form the heat capturing element. Still other approaches to constructing the system may be provided. In some embodiments, the apparatus may be constructed against a manmade or natural hill such that the ground formation supports the angle of the inclined portion 140 of the heat-capturing element 110. The energy collected from the turbines 210 may be converted into a number of different forms and for various practical applications.

In some embodiments, the system may incorporate water vapor for purposes of increasing the mass of the fluid moving through the system. For example, in some embodiments, the system may include an open bath at or near the intake of the system. In some further embodiments, water atomizers or sprayers may be used to create a fine mist allowing the incoming air to more readily grab and/or absorb the water vapor as it enters the system. The increased mass of the fluid moving through the system may increase the power output of the turbines. In some embodiments, the open bath or other water reservoir may include a circulation system for pre-warming the bath based on fluid flowing through the heat-absorbing element. In other embodiments, such a recirculation system may not be included.

For purposes of this disclosure, any system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a personal computer (e.g., desktop or laptop), tablet computer, mobile device (e.g., personal digital assistant (PDA) or smart phone), server (e.g., blade server or rack server), a network storage device, or any other suitable device or combination of devices and may vary in size, shape, performance, functionality, and price. A system may include random access memory (RAM), one or more processing resources such as a central processing unit (CPU), programmable logic controllers, hardware or software control logic, ROM, and/or other types of nonvolatile memory. Additional components of a system may include one or more disk drives or one or more mass storage devices, one or more network ports for communicating with external devices as well as various input and output (I/O) devices, such as a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, or any combination of storage devices. A system may include what is referred to as a user interface, which may generally include a display, mouse or other cursor control device, keyboard, button, touchpad, touch screen, microphone, camera, video recorder, speaker, LED, light, joystick, switch, buzzer, bell, and/or other user input/output device for communicating with one or more users or for entering information into the system. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices. A system may also include one or more buses operable to transmit communications between the various hardware components.

One or more programs or applications, such as a web browser, and/or other applications may be stored in one or more of the system data storage devices. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information.

Hardware and software components of the present disclosure, as discussed herein, may be integral portions of a single computer or server or may be connected parts of a computer network. The hardware and software components may be located within a single location or, in other embodiments, portions of the hardware and software components may be divided among a plurality of locations and connected directly or through a global computer information network, such as the Internet.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart may illustrate a method as a sequential process, many of the operations in the flowcharts illustrated herein can be performed in parallel or concurrently. In addition, the order of the method steps illustrated in a flowchart may be rearranged for some embodiments. Similarly, a method illustrated in a flow chart could have additional steps not included therein or fewer steps than those shown. A method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. An apparatus for converting solar energy, the apparatus comprising:
   a heat-capturing element that generates thermal energy when exposed to solar radiation;
   a canopy arranged about the heat-capturing element and defining a chamber with an intake and an output, the canopy configured for substantially trapping air particles in proximity to the heat-capturing element throughout a pathway from the intake to the output, wherein a portion of the chamber arranged near the output has a decreased cross section;
   a thermal transfer system configured for creating a positive thermal feedback between a portion of the heat-capturing element near the output and a portion of the heat-capturing element near the intake, the thermal transfer system comprising a conduit configured to circulate heat-absorbing fluid from a portion of the heat-capturing element near the output out of the heat-capturing element and directly to a portion of the heat-capturing element near the intake and into the heat-capturing element so as to increase the temperature of the heat-capturing element near the intake and increase the performance of the system; and
   at least one horizontal turbine arranged at the output;

wherein thermal energy generated by the heat-capturing element causes surrounding air particles within the chamber to thermally expand and rise;

wherein the rising air is directed through the portion of the canopy with a decreased cross section and through the output; and wherein the rising air passes across the at least one horizontal turbine as it exits the chamber.

2. The apparatus of claim 1, wherein a portion of the heat-capturing element lies on an inclined plane.

3. The apparatus of claim 1, wherein air particles enter the canopy through the intake portion of the canopy.

4. The apparatus of claim 1, wherein the canopy is comprised of a transparent material.

5. The apparatus of claim 1, wherein the thermal transfer system comprises at least one conduit for transporting heat-absorbing material, wherein the at least one conduit is embedded within the heat-capturing element.

6. The apparatus of claim 5, wherein the thermal transfer system further comprises a heat-absorbing material, wherein the heat-absorbing material collects thermal energy from a first area of the heat-capturing element near the output and, via the at least one conduit, transports it to a second area of the heat-capturing element near the intake.

7. The apparatus of claim 1, further comprising a thermal storage system, comprising:
   a heat-absorbing material;
   at least one conduit for transporting the heat-absorbing material; and
   a storage chamber for storing the heat-absorbing material.

8. The apparatus of claim 7, wherein the heat-absorbing material collects thermal energy from the heat-capturing element and stores it in the storage chamber for later use.

9. An apparatus for generating electric power, the apparatus comprising:
   a heat-capturing element that generates thermal energy when exposed to solar radiation;
   a canopy defining a volume surrounding the heat-capturing element and substantially trapping air particles in proximity to the heat-capturing element, wherein a portion of the volume has a decreased cross section;
   a thermal system comprising:
      a heat-absorbing fluid; and
      at least one conduit for transporting the heat-absorbing fluid;
   at least one horizontal turbine; and
   an electric generator coupled to the at least one horizontal turbine;
   wherein thermal energy generated by the heat-capturing element causes surrounding air particles within the canopy to thermally expand and rise;
   wherein the rising air is directed through the portion of the canopy with a decreased cross section;
   wherein the rising air passes across the at least one horizontal turbine as it exits the canopy; and
   wherein the thermal system is configured to provide a positive thermal feedback by using the heat-absorbing fluid to collect thermal energy from a first area of the heat-capturing element near an output and transport the heat-absorbing fluid out of the heat-capturing element and directly, via the at least one conduit, to a second area of the heat-capturing element near an intake and into the heat-capturing element so as to increase the temperature of the heat-capturing element near the intake and increase the performance of the system.

10. The apparatus of claim 9, wherein a portion of the heat-capturing element lies on an inclined plane.

11. The apparatus of claim 9, wherein air particles enter the canopy through an opening in the canopy.

12. The apparatus of claim 9, wherein the canopy is comprised of a transparent material.

13. The apparatus of claim 9, wherein the at least one conduit for transporting the heat-absorbing fluid is embedded within the heat-capturing element.

14. The apparatus of claim 9, wherein the thermal system further comprises:
   a storage chamber for storing the heat-absorbing fluid; and
   insulating material for insulating the storage chamber.

15. The apparatus of claim 14, wherein the heat-absorbing fluid collects thermal energy from the heat-capturing element and stores it in the storage chamber so that it can be used at a later time.

16. A method for utilizing solar energy, the method comprising:
   exposing a heat-capturing element to solar radiation such that the heat-capturing element generates thermal energy;
   substantially trapping air particles in proximity to the heat-capturing element, such that a portion of the air particles thermally expand and rise when the heat-capturing element generates thermal energy;
   directing the rising air particles through a decreasing volume such that the particles become restricted and their velocity increases;
   performing a positive thermal feedback operation on the heat-capturing element, wherein heat-transfer fluid from a first area of the heat-capturing element near an output is transported out of the heat-capturing element and directly to a second area of the heat-capturing element near an intake and into the heat-capturing element so as to increase the temperature of the heat-capturing element near the intake and increase the performance of the system;
   directing the rising air particles across at least one horizontal turbine, causing the turbine to turn with kinetic energy; and
   converting the kinetic energy from the at least one turbine through the use of an electric generator.

17. The method of claim 16, wherein a portion of the heat-capturing element lies on an inclined plane.

18. The method of claim 16, further comprising collecting unused thermal energy from the heat-capturing element via a heat-absorbing material.

19. The method of claim 18, further comprising storing the heat-absorbing material and unused thermal energy in a storage chamber.

* * * * *